March 11, 1930.   D. G. ROOS   1,749,846
SPRING SHACKLE
Filed Nov. 11, 1927
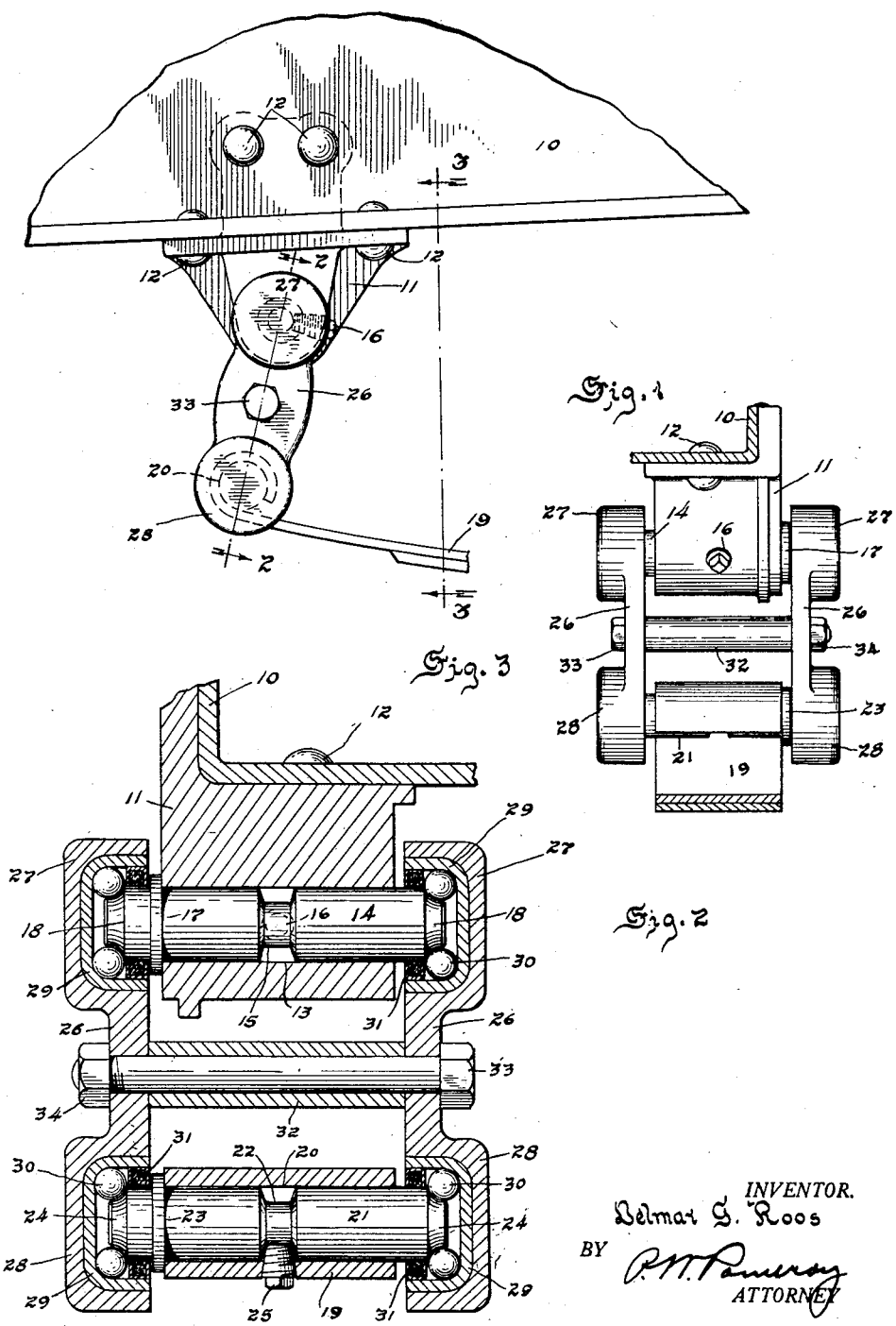

Patented Mar. 11, 1930

1,749,846

UNITED STATES PATENT OFFICE

DELMAR G. ROOS, OF SOUTH BEND, INDIANA, ASSIGNOR TO THE STUDEBAKER CORPORATION, OF SOUTH BEND, INDIANA, A CORPORATION OF NEW JERSEY

SPRING SHACKLE

Application filed November 11, 1927. Serial No. 232,584.

This invention relates to vehicle springs and more particularly to means for shackling the same to the vehicle frame, the principal object being to provide a vehicle spring with a new and improved shackle in which the shackle bolts are restrained against movement transversely of the spring.

Another object is to provide a vehicle spring with a shackle for attaching the same to the vehicle frame, in which the shackle bolts are held against longitudinal movement to prevent the shackle links from contacting with the sides of the spring and the frame spring hanger whereby squeaking of the same is eliminated.

Another object is to provide a vehicle spring with a shackle for attaching the same to the vehicle frame, in which each shackle bolt is provided with a circumferential groove having tapered sides which receives a plug threaded through the spring eye and contacting with the bottom of the groove to hold the bolt against movement transversely of the spring, the plug preferably being smaller than the greatest space between the sides of the groove to permit the self centering of the bolt relative to the frame or spring, the bolt thus preventing the sides of the spring from contacting with the shackle links to eliminate squeaking of the same.

These being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, Figure 1 is a side elevation of a spring shackle showing the same connecting the vehicle spring and frame.

Figure 2 is an enlarged transverse section taken on the line 2—2 of Figure 1, more clearly showing the shackle construction.

Figure 3 is a partial section of the frame and spring taken on the line 3—3 of Figure 1 showing the shackle in elevation.

Heretofore, spring shackles of the type shown in the drawing, have never been provided with means for preventing transverse movement of the shackle bolt relative to the spring. It has been found after considerable testing, that approximately all the annoying squeal and squeaking of vehicle spring shackles arises from the fact that the shackle bolt moves transversely in the spring eye or frame spring hanger, which allows one of the shackle links to contact with and rub against the side of the spring eye or frame bracket. The tests revealed that by anchoring the shackle bolts, the shackle links could be spaced from the sides of the spring hanger frame with the result that the squeaks are eliminated.

Referring to the accompanying drawing, in which like numerals refer to like parts throughout the several views, the frame side channel 10 of the vehicle frame is provided with a depending spring hanger 11 having vertical and horizontal faces which seat respectively against the outer face of the frame channel web and the lower face of the flange thereof, the same being secured together in this position by rivets 12.

The end of the vehicle spring 19 is rolled to provide a circular spring eye 20 which receives the lower shackle pin 21. The pin 21 is formed with a circumferential groove 22 having a cylindrical base and outwardly diverging side walls. A tapered plug 25 is threaded through the metal forming the spring eye 20 and the axis of the same intersects the axis of the pin 21 so that the end of the plug 25 seats firmly against the base of the groove 22. The diameter of the plug 25 at the extreme end contacting with the base of the groove 22, is substantially the same as the width of the groove at its base so that the pin 21 is self centering and is held against movement transversely of the spring 19. The pin 21 is formed with a circumferential flange or shoulder 23 adjacent one end which is adjacent a side face of the spring eye 20 for a purpose to be described later. The ends of the pin 21 project past the sides of the spring eye 20 and the extreme corners formed by the intersection of the cylindrical surface and end faces are filleted to provide curved cirumferential bearing surfaces 24.

The lower end of the spring hanger 11 is formed with a horizontal circular opening 13 which receives the upper shackle pin 14. The pin 14 is likewise formed with a circumferential groove 15 having a cylindrical base and outwardly diverging side walls. The pin 14 has a shoulder 17 abutting against the outer vertical face of the spring hanger 11 and the corners of the pin 14 are likewise filleted to form curved bearing surfaces 18. A tapered plug 16 having its axis intersecting the axis of the pin 14 is threaded through the wall of the opening 13 to engage the base of the groove 15 in the same manner as described for the lower pin 21 to hold the pin 14 against longitudinal movement in the opening 13.

The spring 19 and spring hanger 11 are connected by a pair of complementary links 26 positioned each side of the spring 19, each of which is formed with cup-shaped ends 27 and 28, which telescopically receive cup-shaped ball race members 29. A plurality of ball bearings 30 are circularly arranged within each ball race 29 which, when the shackle is assembled, seat on the curved bearing surfaces 18 and 24 respectively of the ends of the pins 14 and 21. Lubricant retainers 31 surrounding the projecting ends of the pins 14 and 21 nest within the ball race members 29 to hold lubricant therein for the bearing surfaces. The links 26 are held in spaced relationship by a spacer tube 32 to prevent excessive end thrust upon the shackle pins 14 and 21 and are connected by a bolt 33 extending through the spacer tube 32 having a nut 34 threaded thereon to draw the links 26 against the ends of the spacer tube 32.

The shoulders 17 and 23 are formed on the respective shackle bolts 14 and 21 to increase the area thereof subjected to the greatest shearing stress. Tests have proven that the greatest shearing stress occurs in a spring shackle bolt at the end adjacent the outer vertical face of the spring eye, that is, that end of the bolt nearest the outside of the vehicle.

From the foregoing description, it is readily apparent that numerous advantages are gained by anchoring the shackle pins and also increasing the area of the pins at the point where they are subjected to the greatest shearing stress. It can be seen that squeaking of the shackle is eliminated by spacing the shackle links from the sides of the spring eye and the frame spring hanger by using shackle pins anchored against longitudinal movement.

Formal changes may be made in the specific embodiment of the invention described, without departing from the spirit and substance of the broad invention, the scope of which is commensurate with the appended claim.

What I claim is:

The combination with a vehicle frame and spring, of means connecting said spring to said frame comprising, a bracket having a portion positioned beneath the lower flange of said frame and having a portion contacting with the vertical web of said frame, means for securing said bracket to the vertical web and lower flange of said frame, an upper pin having a central portion of reduced diameter and having a flange formed thereon extending through said bracket with said flange in engagement with a side of said bracket, a tapered plug extending through said bracket and engaging the side walls of the reduced portion of said pin to restrain said pin against longitudinal movement, a pair of links enclosing the ends of said pin pivotally supported thereon, a lower pin having a central portion of reduced diameter extending through an eye in said spring pivotally supported by the lower ends of said links, the ends of said pin being enclosed by said links, and a tapered plug extending through said spring and engaging the side walls of the reduced portion of said lower pin to restrain said spring against longitudinal movement of said lower pin.

Signed by me at South Bend, Indiana, this 7th day of November, 1927.

DELMAR G. ROOS.